United States Patent [19]

McCready et al.

[11] Patent Number: 4,711,933
[45] Date of Patent: Dec. 8, 1987

[54] POLYETHERIMIDE ESTERS

[75] Inventors: Russell J. McCready; John A. Tyrell, both of Mt. Vernon, Ind.

[73] Assignee: General Electric Company, Pittsfield, Mass.

[21] Appl. No.: 928,954

[22] Filed: Nov. 10, 1986

[51] Int. Cl.$^4$ .............................................. C08G 63/76
[52] U.S. Cl. ................................... 525/415; 528/289; 528/292; 528/296; 528/302
[58] Field of Search ................. 525/415; 528/288, 289, 528/292, 296, 302

[56] References Cited

U.S. PATENT DOCUMENTS

| | | | |
|---|---|---|---|
| 3,679,639 | 7/1972 | Bargain et al. | 525/415 |
| 4,101,603 | 7/1978 | Smith et al. | 525/415 |
| 4,371,693 | 2/1983 | Wolfe | 528/292 |
| 4,436,896 | 3/1984 | Okamoto et al. | 156/332 |
| 4,661,582 | 4/1987 | McCready | 528/292 |
| 4,663,428 | 5/1987 | Okitu et al. | 528/324 |

Primary Examiner—Lucille M. Phynes
Attorney, Agent, or Firm—William F. Mufatti

[57] ABSTRACT

Polyetherimide ester compositions comprising the reaction products of:
  (i) a mixture of at least one low molecular weight diol and at least one high molecular weight hydroxy terminated polylactone; and
  (ii) a set of reactants selected from
    (a) (i) at least one high molecular weight poly(oxy alkylene)diamine, and (ii) at least one tricarboxylic acid or a derivative thereof, or
    (b) at least one high molecular weight polyoxyalkylene diimide diacid.

Also polyetherimide ester compositions comprising the reaction products of:
  (i) at least one high molecular weight hydroxy terminated polylactone; and
  (ii) a set of reactants selected from
    (a) (i) at least one high molecular weight poly(oxy alkylene)diamine, and (ii) at least one tricarboxylic acid or a derivative thereof, or
    (b) at least one high molecular weight polyoxyalkylene diimide diacid.

51 Claims, No Drawings

POLYETHERIMIDE ESTERS

BACKGROUND OF THE INVENTION

Thermoplastic copolyester adhesives are well known having been described in numerous patents including, for example U.S. Pat. Nos. 3,832,314, 3,932,326, 4,062,907, 4,130,603 and 4,145,335. These are all based on segmented copolyetheresters having long chain ether-ester units and short chain ester units, alone or blended with a low molecular weight thermoplastic resin. Additional hot melt adhesive compositions have been prepared based on polyester amides, see e.g. U.S. Pat. No. 4,254,254.

Thermoplastic polyetherester imides are known having been described in U.S. Pat. No. 4,371,692, to Wolfe, Jr., and U.S. Pat. No. 4,552,950, to McCready. The polyetherester imides described in Wolfe, Jr. are the reaction product of a diol, a polyoxyalkylene glycol and a diimide diacid which is the reaction product of a relatively low molecular weight aliphatic diamine or an aromatic diamine and trimellitic ahydride. These polymers are used as coating materials for cables, belts, and hoses. The polyetherimide esters described in McCready are the reaction product of a low molecular weight diol and a diimide diacid which is the reaction product of a relatively high molecular weight polyoxyalkylene diamine and a tricarboxylic acid having two vicinal carboxyl groups or the anhydride thereof.

SUMMARY OF THE INVENTION

The present invention is directed to thermoplastic elastomeric polyetherimide esters comprising the reaction products of (i) a diol mixture comprised of at least one low molecular weight diol and at least one high molecular weight hydroxy terminated polylactone, and (ii) at least one high molecular weight polyoxyalkylene diimide diacid. The polyoxyalkylene diimide diacid is comprised of the reaction products of at least one high molecular weight polyoxyalkylene diamine and at least one tricarboxylic acid having two vicinal carboxyl groups or its anhydride.

DETAILED DESCRIPTION

The novel polymers of the present invention comprise the reaction products of (i) a diol mixture comprised of at least one low molecular weight diol and at least one dihydroxy terminated polylactone, and (ii) a high molecular weight polyoxyalkylene diimide diacid.

The instant polymers contain at least two recurring structural units represented by the general formulae

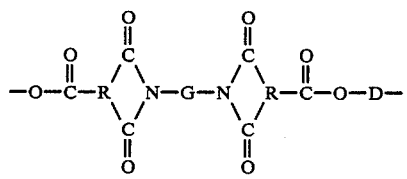

and

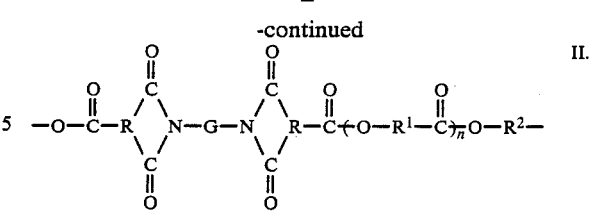

wherein:
each R is independently selected from trivalent organic radicals;
G is the radical remaining after removal of the terminal (or as nearly terminal as possible) amino groups of a long chain alkylene ether diamine;
D is the radical remaining after the removal of the terminal hydroxy groups of a low molecular weight diol;
$R^1$ is a divalent aliphatic radical;
$R^2$ is a divalent aliphatic radical; and
n has a value of at least greater than 2.

The low molecular weight diols suitable for use in preparing the compositions of the instant invention include saturated and unsaturated aliphatic and cycloaliphatic dihydroxy compounds as well as aromatic dihydroxy compounds. These diols are of a low molecular weight, i.e., having an average molecular weight of about 300 or less. When used herein the term "low molecular weight diols" should be construed to include equivalent ester forming derivatives thereof, provided, however, that the molecular weight requirement pertains to the diol only and not to its derivative. Exemplary of ester forming derivatives there may be given the acetates of the diols as well as for example ethylene oxide or ethylene carbonate for ethylene glycol.

Preferred saturated and unsaturated aliphatic and cycloaliphatic low molecular weight diols are those having from 2 to about 19 carbon atoms. Exemplary of these diols there may be given ethylene glycol, propanediol, butanediol, pentanediol, 2-methyl-propanediol, 2,2-dimethyl propanediol, hexanediol, decanediol, 1,2-cyclohexane dimethanol, 1,3-cyclohexane dimethanol, 1,4-cyclohexane dimethanol, butenediol, hexenediol, and the like. Preferred are butanediol and mixtures thereof with hexanediol, butenediol, or cyclohexane dimethanol.

Aromatic diols suitable for use herein are generally those having from 6 to about 19 carbon atoms. Included among these low molecular weight aromatic dihydroxy compounds are resorcinol, hydroquinone, 1,5-dihydroxy naphthalene, 4,4'-dihydroxy diphenyl, bis(p-hydroxy phenyl)methane, and 2,2-bis(p-hydroxy phenyl)propane.

Especially preferred low molecular weight diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole percent, based on the total low molecular weight diol content, be the same diol, more preferably at least about 80 mole percent. Particularly useful compositions are those wherein 1,4-butanediol is present, either alone or in admixture with another diol such as butenediol of cyclohexane dimethanol.

The high molecular weight hydroxy terminated polylactones which comprise the second component of the diol mixture are well known in the art and are generally commercially available or may be readily prepared by known and conventional processes. These hydroxy terminated polylactones have an average molecular weight of at least about 400, preferably at least about 600, and more preferably at least about 900. They may have average molecular weights as high as about 12,000, preferably 10,000, and more preferably 4,000.

These hydroxy terminated polylactones may be represented by the general formula

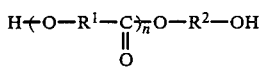 III.

wherein:
$R^1$ is a divalent aliphatic hydrocarbon radical;
$R^2$ is a divalent aliphatic hydrocarbon radical; and
n has a value of greater than at least 2.

The divalent aliphatic hydrocarbon radicals represented by $R^1$ are preferably the alkylene radicals, with those alkylene radicals containing from 2 to about 10 carbon atoms being preferred.

The divalent aliphatic hydrocarbon radicals represented by $R^2$ are selected from the alkylene, alkylidene, alkenylene, cycloalkylene, and cycloalkylidene radicals, with the saturated divalent aliphatic hydrocarbon radicals being preferred. The preferred alkylene and alkylidene radicals represented by $R^2$ are those containing from 2 to about 8 carbon atoms. The preferred cycloalkylene and cycloalkylidene radicals represented by $R^2$ are those containing from about 4 to about 8 ring carbon atoms.

The letter n has a value of at least greater than 2. The value of n will depend upon the molecular weight of the dihydroxy terminated polylactone. Thus n will be such that the polylactone has an average molecular weight of at least about 400, preferably at least about 600, and more preferably at least about 900. Obviously, if $R^1$ is a short chain alkylene radical n will be greater than if $R^1$ is a long chain alkylene radical.

The dihydroxy terminated polylactones of the present invention may conveniently be prepared by the self reaction of at least one lactone. These lactones may be represented by the general formula

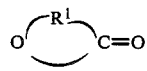 IV.

wherein $R^1$ is as defined above. In the self reaction of these lactones diol initiator is present, which reacts with the lactone and in effect, "opens the ring". This diol may be represented by the general formula

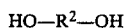 V.

wherein $R^2$ is as defined hereinafore. The diol also acts as an end-group forming reactant.

It is to be understood that $R^1$ may be a straight chain alkylene radical or a branched chain alkylene radical. The same is true for $R^2$ when $R^2$ is an alkylene radical. Mixtures of two or more different high molecular weight dihydroxy terminated polyglycols (hereinafter refered to as high molecular weight diols) as well individual dihydroxy terminated polylactones may be used in the practice of the present invention. The lactones of Formula IV are well known and are described, for example, in Roberts & Caserio, Basic Principles of Organic Chemistry, W. A. Benjamin, Inc., New York, N.Y., 1964, pp. 546-547. The polylactones, as well as methods for their preparation, are described, inter alia, in Billmeyer, Jr., Textbook of Polymer Science, Interscience Publishers, New York, N.Y., 1966, pp. 260-261.

The instant diol mixtures of the low molecular weight diol and the high molecular weight diol, i.e., the high molecular weight hydroxy terminated polylactone, generally contain from about five to about 70 weight percent of at least one high molecular weight diol, preferably from about 10 to about 60 weight percent of at least one high molecular weight diol, and more preferably from about 15 to about 50 weight percent of at least one high molecular weight diol. Weight percent of the high molecular weight diol is calculated based on the total amounts of the high molecular weight diol and the low molecular weight diol present in the diol mixture.

The instant diol mixtures thus contain from about 30 to about 95 weight percent of at least one low molecular weight diol, preferably from about 40 to about 90 weight percent of at least one low molecular weight diol, and more preferably from about 50 to about 85 weight percent of at least one low molecular weight diol. Weight percent of the low molecular weight diol is calculated based on the total amounts of low molecular weight diol and high molecular weight diol present in the diol mixture.

Since the amounts of recurring structural units I and II present in the instant compositions are generally related to and dependent upon the amounts of the low molecular weight diols and high molecular weight diols present in the mixture of diols, the instant compositions generally contain from about 5 to about 70 weight percent of recurring structural unit of Formula II, preferably from about 10 to about 60 weight percent, and more preferably from about 15 to about 50 weight percent. Weight percent of recurring structural unit II present in the instant compositions is calculated based on the total amounts, by weight, of structural units I and II present in the instant compositions.

Polyoxyalkylene diimide diacids suitable for use herein are the high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group, which must be esterifiable, with a high molecular weight polyoxyalkylene diamine.

In general, the polyoxyalkylene diimide diacids useful herein may be characterized by the general formula

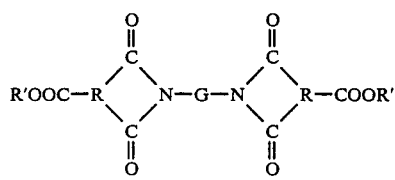 VI.

wherein:
each R is independently a trivalent organic radical, preferably a $C_2$ to $C_{20}$ aliphatic, aromatic, or cycloaliphatic organic radical;
each R' is independently hydrogen or a monovalent organic radical preferably selected from $C_1$ to $C_6$ aliphatic and cycloaliphatic radicals and $C_6$ to $C_{12}$ aromatic radicals, e.g., benzyl, preferably hydrogen; and G is the radical remaining after the removal of the terminal (or as nearly terminal as possible) amino groups of a long chain alkylene ether diamine having an average molecular weight of from about 600 to about 12,000, preferably from about 900 to about 4,000, and a carbon-to-oxygen ratio of from about 1.8 to about 4.3.

Representative long chain ether glycols from which the polyoxyalkylene diamine is prepared by amination include poly(ethylene ether)glycol: poly(propylene ether) glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as ethylene oxide, propylene oxide, and methyltetrahydrofuran. Polyformyl glycols prepared by reacting formaldehyde with diols such as 1,4-butanediol and 1,5-pentanediol are also useful. Especially preferred poly(alkylene ether)glycols are poly(tetramethylene ether)glycol, poly(propylene ether)glycol and poly(ethylene ether)glycols end capped with poly (propylene ether)glycol and/or propylene oxide.

The poly(alkylene ether)diamines suitable for use in the preparation of the polyoxyalkylene diimide diacids of Formula VI may be characterized by the formula $$H_2N—G—NH_2 \qquad \text{VII.}$$

wherein G is as defined hereinafore. These polyether diprimary diamines are available commercially from Texaco Chemical Company under the trademark JEFFAMINE ®. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating the glycol with ammonia and hydrogen over a Nickel-Copper-Chromium catalyst as taught by U.S. Pat. No. 3,654,370. Other methods for their preparation include those taught in U.S. Pat. Nos. 3,155,728 and 3,236,895 and French Pat. Nos. 1,551,605 and 1,466,708. All of the foregoing patents are hereby incorporated herein by reference.

The tricarboxylic acid component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic component, any number of suitable tricarboxylic acid constituents will occur to those skilled in the art including 2,6,7-naphthalene tricarboxylic anhydride, 3,3',4-diphenyl tricarboxylic anhydride, 3,3',4'benzophenone tricarboxylic anhydride, 1,3,4-cyclopentane tricarboxylic anhydride, 2,2',3-diphenyl tricarboxylic anhydride, diphenyl sulfone-3',4-tricarboxylic anhydride, ethylene tricarboxylic anhydride, 1,2,5-naphthalene tricarboxylic anhydride, 1,2,4-butane tricarboxylic anhydride, diphenyl isopropylidene-3,3',4-tricarboxylic anhydride, 3,4-dicarboxyphenyl-3'-carboxyl-phenyl ether anhydride, 1,3,4-cyclohexane tricarboxylic anhydride, and the like. These tricarboxylic acid materials can be characterized by the formula

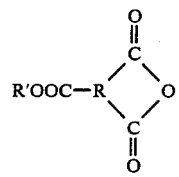

VIII.

wherein R and R' are as defined hereinafore.

Briefly, the polyoxyalkylene diimide diacids of Formula III may be prepared by known imidization reactions including melt synthesis or by synthesizing in a solvent system. For example, the diimide diacid may be prepared by reacting two moles of the tricarboxylic component per mole of polyoxyalkylene diamine by refluxing at between about 100° C. to 300° C., preferably 150° C. to 250° C., in a suitable solvent such as dimethyl formamide, diethylformamide, diethylacetamide, N-methylcaprolactam, or dimethylsulfoxide, among others known to those skilled in the art, or in an azeotropic mixture of said solvent with an additional inert solvent, e.g., xylene. The solvent is subsequently removed by distillation and the residual solvent removed by vacuum drying to leave the diimide diacid. Alternately the diimide diacid may be prepared by melt synthesis wherein the tricarboxylic acid component and the diamine are heated at between 100° C. 300° C., preferably 150° C. to 250° C., while drawing off water, for several hours to produce the diacid.

The polymers of the instant invention can be prepared by melt condensation procedures. Typically, the procedure involves the reaction in the presence of a titanate catalyst of a polyoxyalkylene diimide diacid or an ester thereof of Formula III with the diol mixture containing the low molecular weight diol and the high molecular weight diol, the diol mixture being present in a molar excess. Initially, reaction takes place at about atmospheric pressure while the temperature is increased up to about 160°-260° C. while distilling off volatiles. The resulting prepolymer of relatively low molecular weight can be converted to a high molecular weight polymer by continuing the reaction at 200°-260° C. at reduced pressures, preferably less than 30 mm and more preferably at less than about 5 mm.

The typical procedure for the preparation of the polymers of the present invention can be varied widely. For example, as an alternative to the foregoing process, it is also possible to directly charge the reactor vessel or system with the polyoxyalkylene diimide diacid reactants rather than preform the diimide diacid of Formula VI.

Specifically, when preparing the polymers of this invention by the procedure in which the diimide diacid or ester thereof is formed during the course of the melt condensation, the tricarboxylic component and the polyoxyalkylene diamine of Formula IV are charged in place of the preformed diimide diacid or its ester of Formula VI along with the other ingredients including the diol mixture of low molecular weight diols and high molecular weight diols. From then on, the melt condensation is conducted in substantially the same manner as previously described. In theory, two moles of tricarboxylic component react with one mole of the diamine, however, when the diimide diacid is prepared in the presence of the diol mixture, a minor amount of tricarboxylic component may react with the available hydroxyl groups and ultimately function as a branching agent in the finished polymer. Within limits, the degree of branching in the finished polymer can be controlled by varying the mole ratio of tricarboxylic component to diamine. An excess of diamine reduces the degree of branching, while an excess of tricarboxylic component increases branching. Ratios of 2 moles of tricarboxylic component to 0.85–1.15 moles of diamine have been found to yield useful polymers. In addition to controlling branching by varying the tricarboxylic component/diamine mole ratio, one can compensate for branching by introducing a monofunctional reactant such as benzoic acid in minor amounts.

With reference to branching, it should be noted that polymers of this invention, when prepared from preformed diimide diacid are substantially free of branching. If branching is desired, one needs only to introduce a branching agent, such as trimellitic anhydride, along with the preformed diimide diacid. The amount of branching agent will generally be less than about 0.15 mole per mole of diimide diacid or ester thereof. Useful branching agents other than trimellitic anhydride include trimethyl trimellitate, glycerol, trimethyl proane, trimesic acid and its esters, and the like.

In general, the novel polyetherimide esters described herein may be prepared by conventional esterification/condensation reactions for the production of polyesters. Exemplary of the processes that may be used are those set forth, for example, in U.S. Pat. Nos. 3,023,192, 3,763,109, 3,651,014, 3,663,653 and 3,801,547, all of which are incorporated herein by reference.

It is customary and preferred to utilize a catalyst in the process for the production of the polyetherimide ester of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium, and the alkali metals insofar as these compounds are soluble in the reaction mixture. Specific examples include, zinc acetate, calcium acetate and combinations thereof with antimony trioxide and the like. These catalysts as well as additional useful catalysts are described in U.S. Pat. Nos. 2,567,319, 2,534,028, 2,892,815, 2,937,160, 2,998,412, 3,047,539, 3,110,693 and 3,385,830, all of which are incorporated herein by reference.

Where the reactants and the reactions allow, it is preferred to use the titanium catalysts including the inorganic and organic titanium containing catalysts, such as those described in, for example, U.S. Pat. Nos. 2,720,502, 2,727,881, 2,729,619, 2,822,348, 2,906,737, 3,047,515, 3,056,817, 3,056,628 and 3,075,952, among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, calcium acetate, manganese acetate or antimony trioxide, and/or with a catalyst quencher as described hereinafore. The catalyst should be present in catalytic amounts, i.e., from about 0.005 to about 2.0 percent by weight based on total reactants.

Both batch and continuous methods can be used for any stage of polymer preparation. Further polymerization of lower molecular weight polymers can also be accomplished in the solid phase by heating solid polymer particles in a vacuum or in a stream of inert gas to remove liberated low molecular weight diol.

The preparation of the polymers of this invention can be carried out in the presence of an antioxidant, as well as other stabilizers including thermal and ultraviolet radiation stabilizers. While stabilizers are not normally required on a laboratory scale, their use, particularly oxidative/and or thermal stabilizers, is generally preferred on a commercial scale.

Many of the stabilizers known in the art for polyetherimide esters may be used including phenols and their derivatives, amines and their derivatives, compounds containing both hydroxyl and amine groups, hydroxyazines, oximes, polymeric phenolic esters and salts of multivalent metals in which the metal is in its lower valence state.

Among these stabilizers are included those described in U.S. Pat. No. 4,552,950, incorporated herein by reference.

A second embodiment of the instant invention is a thermoplastic elastomeric polyetherimide ester comprising the reaction products of at least one high molecular weight hydroxy terminated polylactone and at least one high molecular weight polyoxyalkylene diimide diacid. The high molecular weight hydroxy terminated polylactone and the high molecular weight polyoxyalkylene diimide diacid are the same as those described hereinafore. The polymer of this embodiment contains at least one recurring structural unit represented by Formula II wherein G, $R^1$, $R^2$ and n are as defined hereinafore.

The method of preparing the polymers of this embodiment is substantially the same as described hereinafore except that rather than utilizing the diol mixture described hereinafore as one of the reactants a high molecular weight hydroxy terminated polylactone or mixtures thereof is used.

In the reaction of the high molecular weight hydroxy terminated polylactone with the high molecular weight polyoxyalkylene diimide diacid the polylactone may generally be present in equimolar amounts or in a molar excess.

The thermoplastic elastomeric polyetherimide esters of the instant invention are useful as hot melt adhesives. They exhibit improved adhesive properties at low temperatures compared with conventional polyetherimide esters comprised of the reaction products of a low molecular weight diol and a high molecular weight polyoxyalkylene diimide diacid.

DESCRIPTION OF THE PREFERRED EMBODIMENT

In order to more fully and clearly illustrate the present invention the following examples are set forth. It is intended that these examples be considered as illustrative rather than limiting the invention as disclosed and claimed herein. In the examples all parts and percentages are on a weight basis unless otherwise indicated.

The following examples illustrate the polymers of the instant invention.

EXAMPLE 1

This example illustrates a polyetherimide ester derived from a long chain polyalkylene ether diimide diacid, a low molecular weight diol, and a high molecular weight hydroxy terminated polylactone.

Into a reactor vessel are placed 17.22 parts by weight of butanediol, 480.8 parts by weight of a polyoxyalkylene diimide diacid (prepared by the imidization of trimellitic anhydride with Jeffamine D2000, a propylene ether diamine having an average molecular weight of about 2,000), 17.22 parts by weight of a polycaprolactone diol (available from Aldrich Chemical Co. and having an average molecular weight of about 2,000) and a titanium catalyst. The mixture is heated to about 180° C. whereupon water is generated. After an hour the pot temperature is increased to about 240° C., vacuum applied, and after a total of 3 hours reaction time the product is cooled and a tacky polymer obtained.

The viscosity of this polyetherimide ester was measured at 100° C. and determined to be 550 centipoise. Infrared Spectrum was obtained and was 3462 cm$^{-1}$, 2964 cm$^{-1}$, 1773 cm$^{-1}$, 1715 cm$^{-1}$, 1370 cm$^{-1}$, and 1100 cm$^{-1}$.

EXAMPLE 2

This example illustrates a polyetherimide ester derived from a long chain polyalkylene ether diimide diacid and a high molecular weight hydroxy terminated polylactone.

Into a reactor vessel are placed 100 parts by weight of a polyoxyalkylene diimide diacid (prepared by the imidization of trimellitic anhydride with Jeffamine D2000, a propylene ether diamine having an average molecular weight of about 2,000), 84.35 parts by weight of a polycaprolactone diol (available from Aldrich Chemical Co. and having an average molecular weight of about 2,000) and a titanium catalyst. The mixture is heated to about 180° C. whereupon water is generated. After an hour the pot temperatures is increased to about 240° C., vacuum applied, and after a total of 3 hours reaction time the polyetherimide ester product is cooled and a tacky polymer obatined. The viscosity was measured at 200° C. and determined to be 8,000 centipoise. Infrared Spectrum was obtained and was 2965 cm$^{-1}$, 1774 cm$^{-1}$, 1733 cm$^{-1}$, 1375 cm$^{-1}$, and 1106 cm$^{-1}$.

EXAMPLE 3

This example illustrates a polyetherimide ester derived from a long chain polyalkylene ether diimide diacid and a high molecular weight hydroxy terminated polylactone.

Into a reactor vessel are placed 200 parts by weight of a polyoxyalkylene diimide diacid (prepared by the imidization of trimellitic anhydride with Jeffamine D2000, a propylene ether diamine having an average molecular weight of about 2,000), 44.7 parts by weight of a polycaprolactone (available from Aldrich Chemical Co. having an average molecular weight of about 530) and a titanium catalyst. The mixture is heated to about 180° C. whereupon water is generated. After an hour the pot temperature is increased to about 240° C., vacuum applied, and after a total of 3 hours reaction time the polyetherimide ester product is cooled and a tacky polymer obtained.

The viscosity was measured at 100° C. and determined to be 1,425 centipoise. Infrared Spectrum was obtained and was 2965 cm$^{-1}$, 1774 cm$^{-1}$, 1733 cm$^{-1}$, and 1106 cm$^{-1}$.

Obviously, other modificationas and variations of the present invention are possible in light of the above teachings. It is, therefore, to be understood that changes may be made in the particular embodiments of the invention described which are within the full intended scope of the invention as defined by the appended claims.

What is claimed is:

1. A polyetherimide ester composition comprising the reaction products of:
   (i) a mixture of at least one low molecular weight diol and at least one high molecular weight hydroxy terminated polylactone; and
   (ii) a set of reactants selected from
      (a) (i) at least one high molecular weight poly(oxy alkylene)diamine, and (ii) at least one tricarboxylic acid or a derivative thereof, or
      (b) at least one high molecular weight polyoxyalkylene diimide diacid.

2. The composition of claim 1 wherein said high molecular weight hydroxy terminated polylactone has an average molecular weight of at least about 400.

3. The composition of claim 2 wherein said high molecular weight hydroxy terminated polylactone has an average molecular weight of at least about 600.

4. The composition of claim 3 wherein said high molecular weight hydroxy terminated polylactone has an average molecular weight of at least about 900.

5. The composition of claim 2 wherein said high molecular weight hydroxy terminated polylactone is represented by the formula

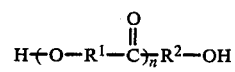

wherein:

R$^1$ is selected from divalent aliphatic hydrocarbon radicals;

R$^2$ is selected from divalent hydrocarbon radicals; and n has a value of at least greater than 2.

6. The composition of claim 5 wherein R$^1$ is selected from alkylene radicals.

7. The composition of claim 6 wherein said alkylene radicals contain from 2 to about 10 carbon atoms.

8. The composition of claim 7 wherein R$^1$ is the pentylene radical.

9. The composition of claim 5 wherein R$^2$ is selected from divalent aliphatic or cycloaliphatic radicals.

10. The composition of claim 9 wherein said aliphatic radicals contain from 2 to about 8 carbon atoms and said cycloaliphatic radicals contain from about 4 to about 8 ring carbon atoms.

11. The composition of claim 2 wherein said low molecular weight diol has an average molecular weight of about 300 or less.

12. The composition of claim 11 wherein said diol mixture contains from about 5 to about 70 weight percent of high molecular weight hydroxy polylactone.

13. The composition of claim 12 wherein said diol mixture contains from about 10 to about 60 weight percent of high molecular weight hydroxy polylactone.

14. The composition of claim 13 wherein said diol mixture contains from about 15 to about 50 weight percent of said high molecular weight hydroxy polylactone.

15. The composition of claim 1 wherein (ii) is (a).

16. The composition of claim 15 wherein said high molecular weight poly(oxy alkylene)diamine is represented by the formula

H$_2$N—G—NH$_2$ wherein G is the radical remaining after the removal of the amino groups of a long chain alkylene ether diamine having an average molecular weight of from about 600 to about 12,000.

17. The composition of claim 16 wherein said alkylene ether diamine has an average molecular weight of from about 900 to about 4,000.

18. The composition of claim 16 wherein said tricarboxylic acid (ii) (a) (ii) is represented by the formula

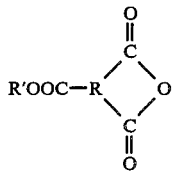

wherein R is a C$_2$ to C$_{20}$ aliphatic, cycloaliphatic or aromatic trivalent organic radical, and R$^1$ is selected from hydrogen or a C$_1$ to C$_6$ aliphatic or cycloaliphatic radical.

19. The composition of claim 18 wherein said tricarboxylic acid is trimellitic anhydride.

20. The composition of claim 1 wherein (ii) is (b).

21. The composition of claim 20 wherein said high molecular weight polyoxyalkylene diimide diacid is represented by the formula

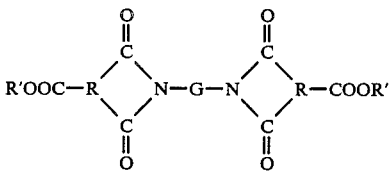

wherein:
each R is independently selected from C$_2$ to C$_{20}$ aliphatic and cycloaliphatic trivalent organic radicals or C$_6$ to C$_{20}$ aromatic trivalent organic radicals;
G is the radical remaining after removal of the amino groups of a long chain alkylene ether diamine having an average molecular weight of from about 600 to about 12,000; and
R' is hydrogen or a C$_1$ to C$_6$ aliphatic or cycloaliphatic monovalent organic radical.

22. The composition of claim 21 wherein the polyoxyalkylene diimide diacid is such that each R is a C$_6$ trivalent aromatic hydrocarbon radical, each R' is hydrogen, and G is the radical remaining after removal of the amino groups of a long chain alkylene ether diamine having an average molecular weight of from about 900 to about 4,000.

23. A polyetherimide ester polymer comprised of at least the following recurring structural units:

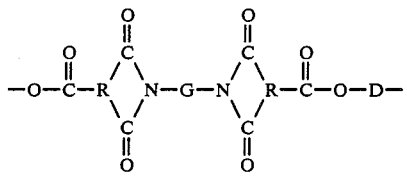

and

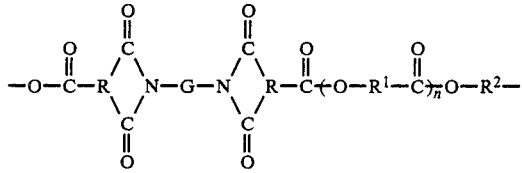

wherein:
G is the radical remaining after the removal of the amino groups of a long chain alkylene ether diamine having an average molecular weight of from about 600 to about 12,000;
each R is independently selected from C$_2$ to C$_{20}$ aliphatic or cycloaliphatic trivalent organic radicals or C$_6$ to C$_{20}$ aromatic trivalent organic radicals;
R$^1$ is selected from divalent aliphatic hydrocarbon radicals;
R$^2$ is selected from divalent hydrocarbon radicals; and
n has a value of at least greater than 2.

24. The polymer of claim 23 wherein G is the radical remaining after the removal of the amino groups of a long chain alkylene ether diamine having an average molecular weight of from about 900 to about 4,000.

25. The polymer of claim 23 wherein said low molecular weight diol has an average molecular weight of about 300 or less.

26. The polymer of claim 25 wherein

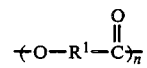

has an average molecular weight of at least 400.

27. The polymer of claim 27 wherein said average molecular weight is at least about 600.

28. The polymer of claim 27 wherein said average molecular weight is at least about 900.

29. The polymer of claim 26 wherein R$^1$ is selected from alkylene radicals.

30. The polymer of claim 29 wherein said alkylene radicals contain from 2 to about 10 carbon atoms.

31. The polymer of claim 30 wherein R$^1$ is the pentylene radical.

32. The polymer of claim 31 wherein R$^2$ is an alkylene radical.

33. The polymer of claim 32 wherein said alkylene radical contain from 2 to about 8 carbon atoms.

34. The polymer of claim 23 which contains from about 5 to about 70 weight percent of II.

35. The polymer of claim 34 which contains from about 10 to about 60 weight percent of II.

36. The polymer of claim 35 which contains from about 15 to about 50 weight percent of II.

37. A polyetherimide ester polymer comprising the reaction products of:
(i) at least one high molecular weight hydroxy terminated polylactone; and
(ii) a set of reactants selected from
(a) (i) at least one high molecular weight poly(oxy alkylene)daimine, and (ii) at least one tricarboxylic acid or a derivative thereof, or
(b) at least one high molecular weight polyoxyalkylene diimide diacid.

38. The polymer of claim 37 wherein said high molecular weight hydroxy terminated polylactone has an average molecular weight of at least about 400.

39. The polymer of claim 38 wherein said high molecular weight hydroxy terminated polylactone is represented by the formula

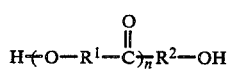

wherein:
$R^1$ is selected from divalent aliphatic hydrocarbon radicals;
$R^2$ is selected from divalent hydrocarbon radicals; and
n has a value of at least greater than 2.

40. The polymer of claim 39 wherein $R^1$ is selected from alkylene radicals.

41. The polymer of 40 wherein said alkylene radicals contain from 2 to about 10 carbon atoms.

42. The polymer of claim 41 wherein $R^1$ is the pentylene radical.

43. The polymer of claim 39 wherein $R^2$ is selected from divalent aliphatic or cycloaliphatic radicals.

44. The polymer of claim 38 wherein said polylactone is polycaprolactone.

45. The polymer of claim 38 wherein (ii) is (a).

46. The polymer of claim 45 wherein said high molecular weight poly(oxy alkylene)diamine is represented by the formula

wherein G is the radical remaining after the removal of the amino groups of a long chain alkylene ether diamine and has an average molecular weight of from about 600 to about 12,000.

47. The polymer of claim 46 wherein said poly (oxy alkylene)diamine has an average molecular weight of from about 900 to about 4,000.

48. The polymer of claim 47 wherein said tricarboxylic acid is trimellitic anhydride.

49. The polymer of claim 38 wherein (ii) is (b).

50. The polymer of claim 49 wherein said high molecular weight polyoxyalkylene diimide diacid is represented by the formula

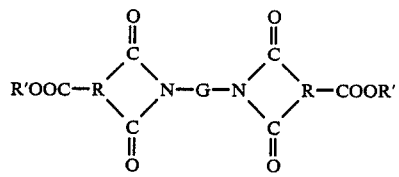

wherein:
each R is independently selected from $C_2$ to $C_{20}$ aliphatic or cycloaliphatic trivalent organic radicals or $C_6$ to $C_{20}$ aromatic trivalent organic radicals;
G is the radical remaining after the removal of the amino groups of a long chain alkylene ether diamine having an average molecular weight of from about 600 to about 12,000; and
R' is hydrogen or a $C_1$ to $C_6$ aliphatic or cycloaliphatic organic radical.

51. The polymer of claim 50 wherein the polyoxyalkylene diimide diacid is such that each R is a $C_6$ trivalent aromatic hydrocarbon radical, each R' is hydrogen, and G is the radical remaining after the removal of the amino groups of a long chain alkylene ether diamine having an average molecular weight of from about 900 to about 4,000.

* * * * *